United States Patent
Hashimoto et al.

(10) Patent No.: US 8,941,778 B2
(45) Date of Patent: Jan. 27, 2015

(54) VIDEO DISPLAY APPARATUS

(75) Inventors: Mitsuru Hashimoto, Osaka (JP);
Yasunori Takanezawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 441 days.

(21) Appl. No.: 12/918,682

(22) PCT Filed: Nov. 27, 2008

(86) PCT No.: PCT/JP2008/071499
§ 371 (c)(1),
(2), (4) Date: Aug. 20, 2010

(87) PCT Pub. No.: WO2009/104320
PCT Pub. Date: Aug. 27, 2009

(65) Prior Publication Data
US 2010/0328530 A1  Dec. 30, 2010

(30) Foreign Application Priority Data

Feb. 21, 2008 (JP) ................................ 2008-040207

(51) Int. Cl.
*H04N 7/01* (2006.01)
*G09G 3/36* (2006.01)
(Continued)

(52) U.S. Cl.
CPC ............ *H04N 7/014* (2013.01); *G09G 3/3611* (2013.01); *H04N 5/145* (2013.01); *H04N 7/0112* (2013.01);
(Continued)

(58) Field of Classification Search
CPC ....................................................... H04N 7/01
USPC ................................................ 348/441, 459
See application file for complete search history.

(56) References Cited

U.S. PATENT DOCUMENTS 4,695,882 A * 9/1987 Wada et al. ................. 348/416.1
8,358,373 B2 * 1/2013 Yamamoto et al. ........... 348/441
(Continued)

FOREIGN PATENT DOCUMENTS

JP  60-158786 A  8/1985
JP  1-243790 A  9/1989
(Continued)

OTHER PUBLICATIONS

Castagno et al., "A Method for Motion Adaptive Frame Rate Up-Conversion", IEEE Circuits and Systems Society, Oct. 1996, vol. 6, Iss. 5.

*Primary Examiner* — Hunter B Lonsberry
*Assistant Examiner* — Tung T Trinh
(74) *Attorney, Agent, or Firm* — Birch Stewart Kolasch & Birch, LLP

(57) ABSTRACT

A video display apparatus is provided wherein even for ones, such as 32 pull-down and 22 pull-down, in which since the motion range of an original material is wide, there is a high probability of degradation of the precision of detected vectors, the processing time is effectively used to enhance the precision of detected vectors, thereby generating interpolated pictures having higher qualities. The apparatus recalculates, based on motion vectors (Va) used in generating the first interpolated picture, motion vectors for use in the next interpolated picture generation, thereby detecting recalculated motion vectors having higher precision and less errors than the original motion vectors. A repeated-picture determining part utilizes an interval, during which identical pictures requiring no vector detections consecutively appear, to further improve the precision of motion vectors.

4 Claims, 6 Drawing Sheets

(51) Int. Cl.
  *H04N 5/14* (2006.01)
  *G09G 3/20* (2006.01)

(52) U.S. Cl.
  CPC ........... *H04N 7/0132* (2013.01); *G09G 3/2025* (2013.01); *G09G 2320/0261* (2013.01); *G09G 2320/106* (2013.01)
  USPC ......................................... 348/441; 348/459

(56) References Cited

U.S. PATENT DOCUMENTS

| | | | |
|---|---|---|---|
| 2002/0150162 A1* | 10/2002 | Liu et al. | 375/240.17 |
| 2004/0246374 A1* | 12/2004 | Mishima et al. | 348/441 |
| 2006/0262853 A1 | 11/2006 | Li et al. | |
| 2008/0151108 A1* | 6/2008 | Doswald | 348/456 |
| 2008/0151109 A1* | 6/2008 | Doswald | 348/459 |
| 2008/0304568 A1* | 12/2008 | Chang | 375/240.16 |
| 2009/0195691 A1* | 8/2009 | Wyman | 348/452 |
| 2010/0020232 A1* | 1/2010 | Mori et al. | 348/452 |

FOREIGN PATENT DOCUMENTS

| | | | | |
|---|---|---|---|---|
| JP | 3-280681 | A | 12/1991 | |
| JP | 2930675 | B2 | 8/1999 | |
| JP | 3295437 | B2 | 6/2002 | |
| JP | 2002-335422 | A | 11/2002 | |
| JP | 2004-236023 | A | 8/2004 | |
| JP | 2007-281961 | A | 10/2007 | |
| WO | WO 2008/018015 | A1 | 2/2008 | |
| WO | WO 2008035475 | * | 3/2008 | H04N 7/01 |

* cited by examiner

VIDEO DISPLAY APPARATUS

TECHNICAL FIELD

The present invention relates to a video display apparatus, and specifically, relates to a display apparatus for displaying pictures on a liquid crystal panel, capable of reducing motion blur, which is a problem specific to liquid crystal displays caused when displaying motion pictures, by inserting interpolated pictures between frames and realizing double speed driving thereof.

BACKGROUND ART

Motion blur caused in liquid crystal panels is considered to be caused by the characteristics of the liquid crystal adopting a hold-type system, in which the liquid crystal holds the charge and maintains emission (refer for example to patent document 1).

In conventional cathode ray tubes (CRT) and the like in which electron beams are irradiated to fluorescent bodies, the form of emission of pixels adopts an impulse-type system, in which emission time is short.

The human vision with respect to a moving object can follow the movement smoothly, so that when a hold-type emission is adopted in which the luminance level is held until the next frame, an afterimage is caused via a time integration effect. This phenomenon is called a motion blur.

One method for reducing such motion blur is to double the frame rate to thereby approximate the liquid crystal display to an impulse type display. This technique is called an FRC (frame rate converter) which is already applied to practical use in liquid crystal displays. Examples of this technique for doubling the rate include simple repeating of the same pictures, or interpolating frames between frames via linear interpolation, but unnaturality of movement (jerkiness, judder) occurred, or the motion blur caused by the hold-type emission could not be sufficiently improved, and the picture quality could not be improved sufficiently.

Therefore, in order to eliminate the effect of jerkiness and improve the quality of the motion picture, an FRC technique of a motion-compensating frame interpolating process has been invented and put to practical use.

One example of this circuit is shown in FIG. 3, and the contents of the process will be described below.

The input picture signal B is initially divided in a preprocessing filter 30 into blocks having a predetermined number of pixels and a predetermined number of lines, and filtering is performed within the block to remove unnecessary noise or the like. This block is called a detection block.

Next, in a motion vector detecting part 32, a motion vector (detected vector) of each detection block between the preceding frame and the current frame delayed via the frame memory 31 is computed by selecting candidate vectors from the vector memory 33 and via an iterative gradient method. The details of the contents of the motion vector detecting process (the portion surrounded by dotted line frame 3A) will follow.

An interpolated vector evaluating part 34 evaluates the detected vector obtained in the motion vector detecting part 32, and based on the evaluation result, allocates an interpolated vector for each interpolated block between frames. Here, the interpolated block has a smaller size than the detection block. Actually, the interpolated picture to be generated is divided into interpolated block units, and the detected vector allocated to the detection block is allocated to an interpolated block within an interpolated picture that the vector passes when the detected vector is extended from the preceding frame to the current frame. If a different detected vector has already been allocated, then an evaluation is performed to determine which of the vectors is more appropriate, and the more appropriate vector is adopted.

Next, an interpolated picture is generated in an interpolated frame generating part 36 using the interpolated vector allocated by the interpolated vector evaluating part 34. The example of the procedure will be described with reference to FIG. 4.

A dotted line frame W denotes the detection block to be processed. In order to obtain data of one pixel P within the detection block of the interpolated picture, points P1 and P2 are obtained by extending the interpolated vector allocated to the position of pixel P to the preceding and following original pictures. Then, by interpolating the four pixels around points P1 and P2, the data on the interpolated pixel P can be obtained.

The interpolated picture is obtained by the above process, and a double rate conversion is realized by outputting data corresponding to the original picture, the interpolated picture and the original picture via a time base converting part 37 considering the timing with the original picture.

FIG. 5 shows a detailed configuration of the block related to motion vector detection surrounded by the dotted line frame 3A of FIG. 3, and the contents of the process will be described hereafter.

At first, in a vector selecting part 52, an initial vector of a data of a preprocessed input signal A and a block corresponding to the same position as signal A of a preceding frame delayed via a frame memory 50 is determined via DFD value comparison using a number of candidate vectors read out from a vector memory 51. The vector memory 51 stores initial vector candidates such as the computed vector close to the target block, the vectors detected in the preceding frame and the frame before the preceding frame, and the average value of the vectors of the whole frame. DFD (displaced field difference) refers to the probability of a vector, which is the sum of absolute values of the difference between frames of the respective pixels within the block, the probability becoming higher as the value becomes smaller. Based on the initial vector selected in this manner, a motion vector calculating part 53 computes a detected vector Va' of the respective block unit using an iterative gradient method.

The iterative gradient method is described in detail in patent document 2, and a simple principle of the method is shown in FIG. 6. A block B1 of the current frame is obtained by moving a block B0 of a current frame which is positioned at the same position as block B of a preceding frame for an initial vector V0. The gradient method is applied to the block B1 and the block B of the preceding frame to obtain a primary vector V1. Then, the gradient method is applied to block B2 of the current frame denoted by V1 and the block B of the preceding frame to obtain a secondary vector V2, and the process goes on in a similar manner, according to which the gradient method is applied to block B3 of the current frame denoted by V2 and the block B of the previous frame. In general, the value of the vector size obtained via the gradient method becomes smaller in the following manner, $|V0|>|V1|>|V2|>|V3|$, therefore, as the number of application of the method increases, the detected vector precision being calculated is improved. However, in the actual circuit, the number of times of the process is limited, since the process must be performed in real time.

The above description summarized the art of film rate conversion (FRC) put into practical use.

[Patent document 1]
Publication of Japanese patent No. 3295437
[Patent document 2]
Publication of Japanese patent No. 2930675

SUMMARY OF THE INVENTION

Problem to be Solved by the Invention

Now, we will consider a case where a picture material of 24 frames per second such as a movie or a picture material of 30 frames per second such as a CG image is subjected to rate conversion via a telecine apparatus or the like and converted to 60 frames per second, which is then input to an apparatus having applied the above-described FRC technique. These pictures are motion pictures so-called 32 pulldown or 22 pulldown in which identical pictures are continued for two or three frames, wherein the motion (difference) between pictures exists every couple of frames or every other frame.

Since the rate of the original picture material is 24 frames per second or 30 frames per second, in the case of a 120 Hz display, the picture to be interpolated is either four frames or three frames. In other words, motion vectors are detected between different pictures at every couple of frames or every other frame, and four or three interpolated pictures are generated based on the detected vectors. The relationship between the input original picture and the output picture is shown in FIG. 2. The motion range is greater than double the motion between adjacent pixels compared to a case where the same motion is taken via normal 60 P. Therefore, the detection precision of the motion vectors via the above-described iterative gradient method is rough, and the number of interpolated pixels generated via vectors having insufficient precision becomes high, according to which the quality of the interpolated pictures is deteriorated.

The object of the present invention is to provide a video display apparatus capable of effectively utilizing the processing time to enhance the precision of the detected vector and to generate interpolated pictures with higher quality, even when the apparatus is processing data such as 32 pulldown and 22 pulldown having a high probability of degradation of the precision of detected vectors since the motion range of the original material is wide.

In order to improve the picture quality, it is necessary to enhance the precision of vectors. According to the iterative gradient method, intrinsically, the precision can be enhanced by increasing the number of times of application, but the process is terminated due to the limitation in processing time.

Now, when we look at the 32 pulldown and 22 pulldown as input signals, there are portions in which the same picture is continued and there is no need to perform any motion detecting process. These portions correspond to the area between original pictures 3B and 4B, between 4B and 5B or between 3b and 4b of FIG. 2. By using the detected vector detected immediately prior thereto as initial vector, and reapplying the iterative gradient method during this period, the precision of vectors to be used for generating the subsequent interpolated pictures can be further enhanced.

According to this process, the vector V2 in the explanatory view of the iterative gradient method (FIG. 6) is used as initial vector to obtain a primary vector V3 and a secondary vector V4, according to which the enhancement of vector precision can be expected. Further, by calculating the difference between the primary vector and the secondary vector computed by this process and determining that the precision of the detected vector of the detection block is probable when the difference becomes equal to or smaller than a certain threshold, the block can be removed from the target of the second detected vector processing, according to which the spared time can be used to perform the iterative gradient method to other blocks having inferior vector precision, so that it becomes possible to ensure the application of the method for more than three times. Thereby, the accuracy of the detected vector can be enhanced throughout the frame and the quality of the interpolated pictures can be improved.

The present invention provides a video display apparatus composed of a liquid crystal display apparatus having a means for converting a frame rate by interpolating a picture, which has been corrected based on an interframe motion vector, between frames of input video signals, wherein when interpolating signals representative of two or three consecutive identical pictures generated in telecine or the like, motion vectors for use in a next interpolated picture generation are recalculated based on motion vectors used in generating a first interpolated picture, thereby detecting motion vectors having higher precision and less errors.

Further, the present invention provides a video display apparatus further comprising a repeated-picture determining part, and utilizes an interval during which identical pictures requiring no vector detections consecutively appear to further improve the precision of motion vectors detected between a picture and an immediately preceding different picture.

Moreover, the present invention provides a video display apparatus further comprising a circuit for determining a precision of vectors calculated via the motion vector detection using a threshold value defined in advance.

Even further, the present invention provides a video display apparatus, wherein vectors determined as having a high precision in the determining circuit is not subjected to a subsequent recalculation process, and a spared calculation time thereof is applied to recalculation of a low precision vector not having a probable value.

Effect of the Present Invention

According to the present apparatus, even when processing data such as 32 pulldown and 22 pulldown, in which the probability of degradation of the precision of detected vectors according to the prior art is high since the motion range of the original material is wide, it becomes possible to effectively use the processing time to enhance the precision of the detected vectors and generate interpolated pictures with enhanced quality.

DESCRIPTION OF REFERENCES

Figure 1:
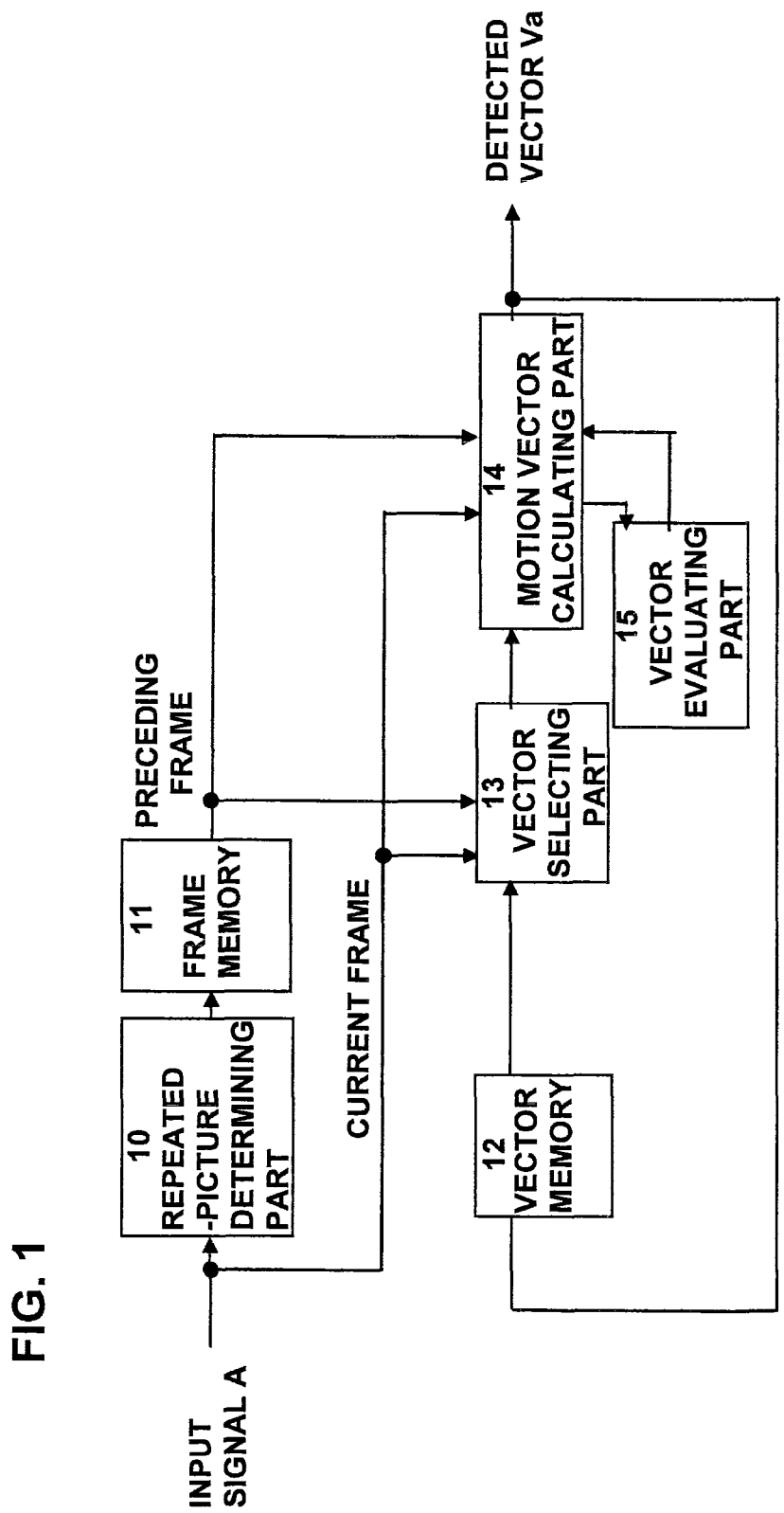
FIG. 1 is a block diagram showing a circuit section for performing a motion vector detection process of a video display apparatus according to the present invention.
Figure 2:
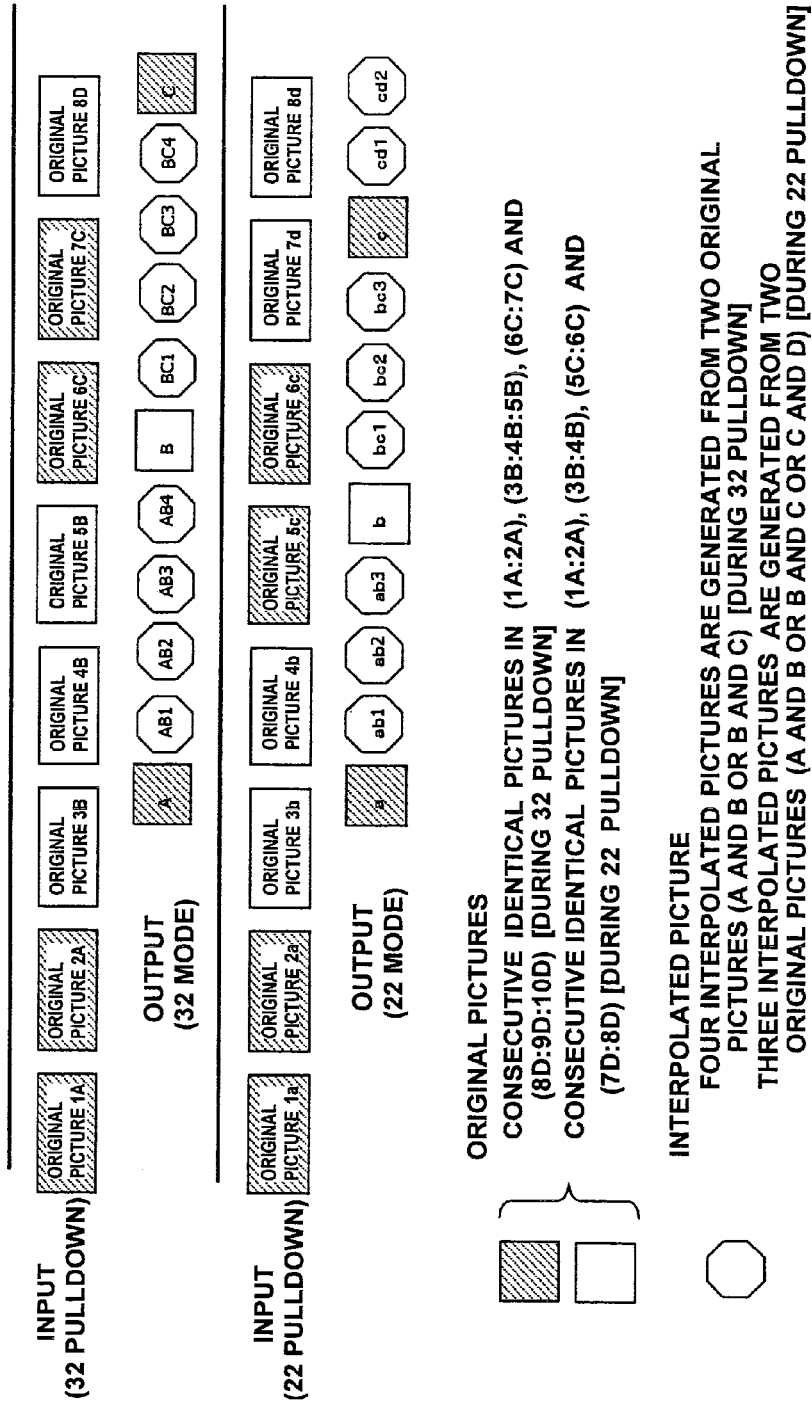
FIG. 2 is an explanatory view of an interpolating process via FRC in the case of a film material.

10 repeated-picture determining part
11 frame memory 12 vector memory
13 vector selecting part
14 motion vector calculating part
15 vector evaluating part
30 preprocessing filter
31 frame memory (for detecting motion)
32 motion vector detecting part
33 vector memory
34 interpolated vector evaluating part
35 frame memory (for interpolating process)
36 interpolated frame generating part
37 time base converting part
50 frame memory
51 vector memory
52 vector selecting part
53 motion vector calculating part

BEST MODE FOR CARRYING OUT THE INVENTION

Now, a preferred embodiment for carrying out the present invention will be described in detail with reference to circuit configuration examples.

Figure 3:
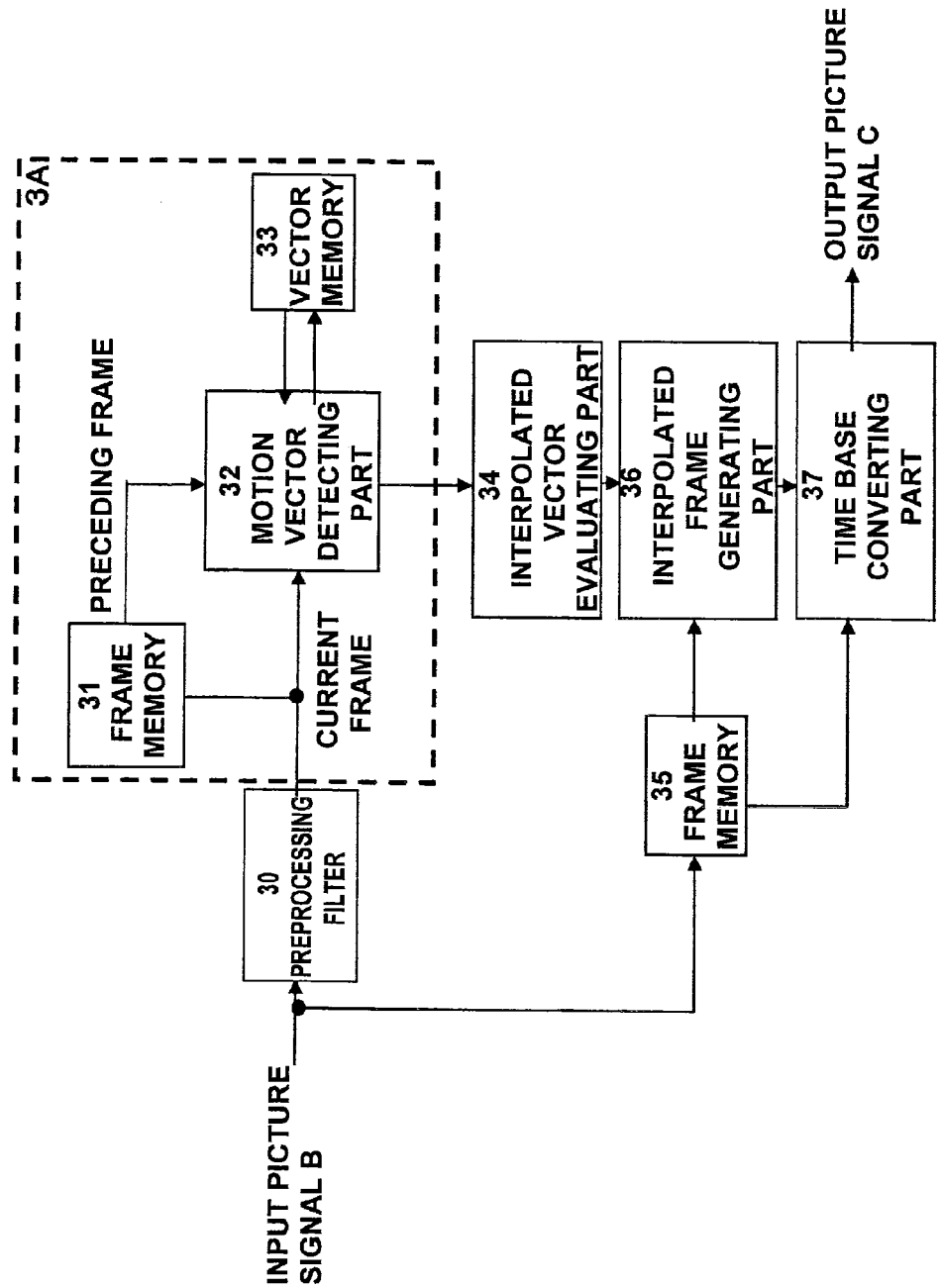
FIG. 3 is a block diagram showing an example of configuration of an FRC circuit.
Figure 4:
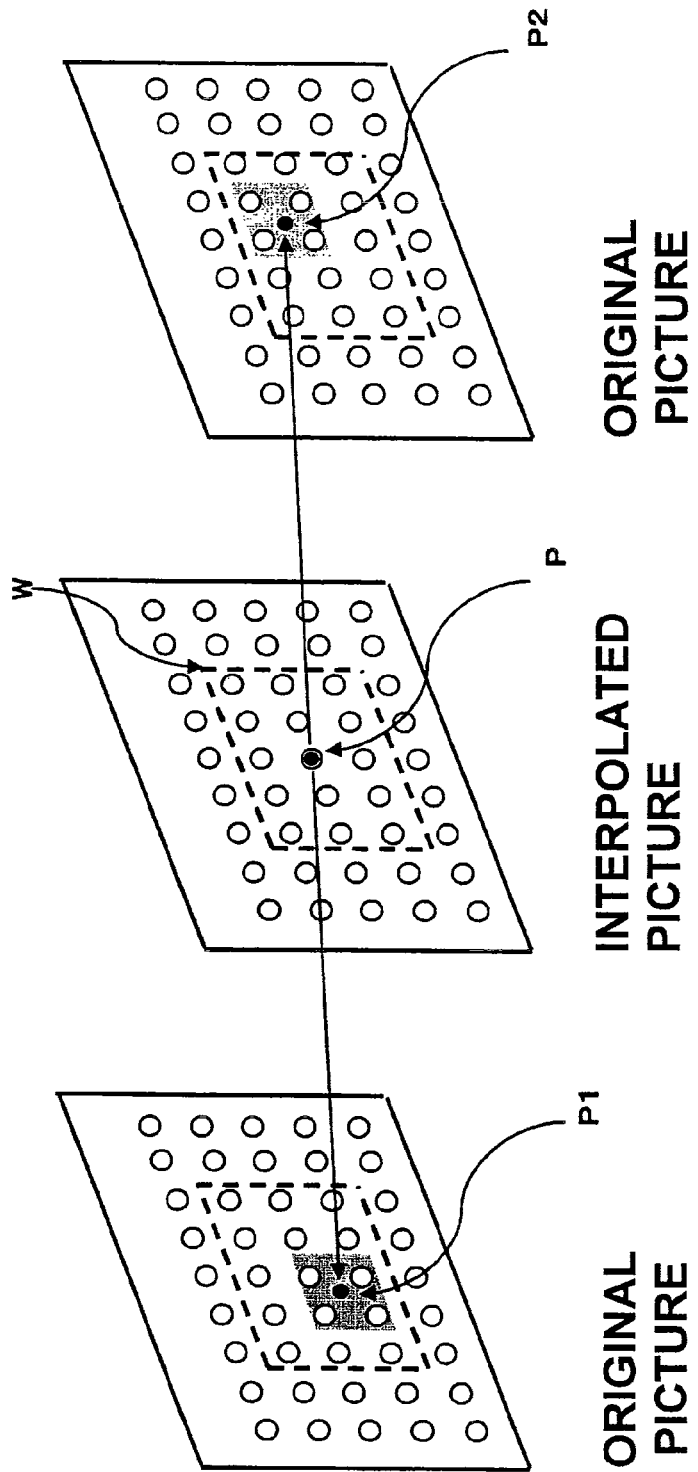
FIG. 4 is an explanatory view for generating interpolated pictures according to a prior art RFC.
Figure 5:
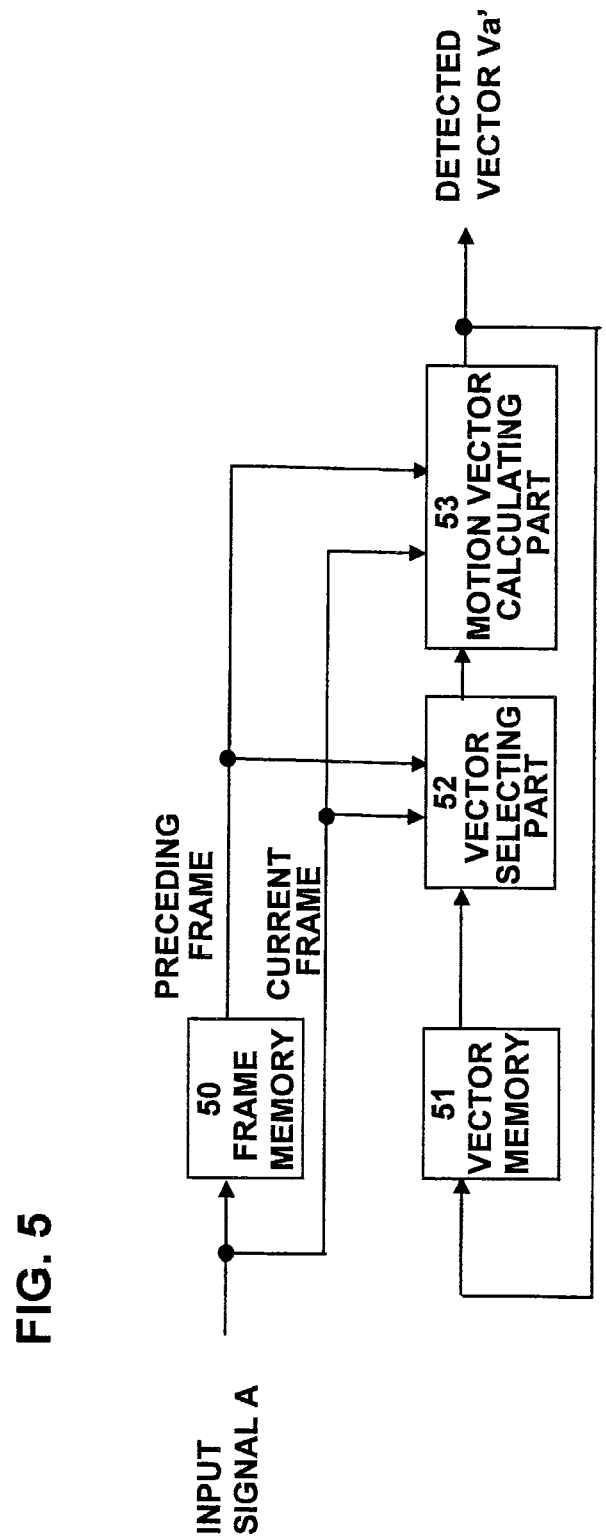
FIG. 5 is a block diagram illustrating an arrangement of a prior art motion vector detecting part.
Figure 6:
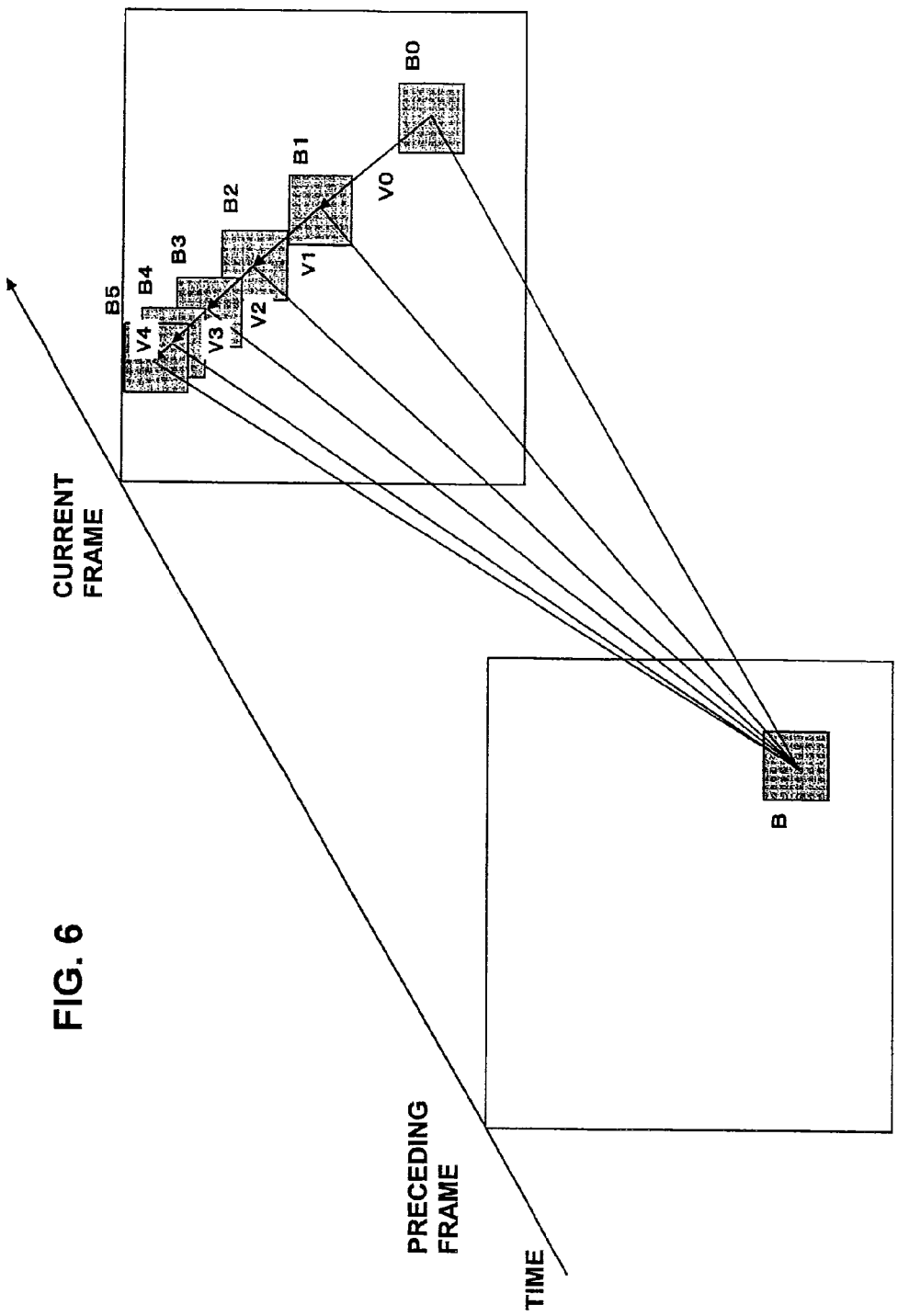
FIG. 6 is an explanatory view of an iterative gradient method.

At first, FIG. 1 illustrates a simple circuit configuration example according to the present invention. FIG. 1 corresponds to the portion surrounded by a dotted line frame 3A (FIG. 5) of the prior art illustrated in FIG. 3.

An input signal A is a picture signal of 32 pulldown or 22 pulldown. A repeated-picture determining part 10 determines whether the image belongs to a repeated picture portion or not, and selects a picture data to be stored in a frame memory 11.

In the first vector detection process, based on a preceding frame data from the frame memory 11 and a current frame data, an initial vector is determined via DFD value calculation from a number of candidate vectors in a vector selecting part 13, and in a motion vector calculating part 14, a detected vector Va is obtained using an iterative gradient method. The detected vector Va is stored in a vector memory 12 as a candidate vector of an initial vector.

In this process, vector evaluation during the iterative gradient method is performed in a vector evaluating part 15. Whether precision is high or low is determined based on whether a difference between the absolute values of a primary vector and a secondary vector is smaller or not than a threshold defined in advance, and whether a next vector detection process of that detection block is unnecessary or not is determined.

According to a second process in which the same picture is entered, the vector selecting part 13 only reads out the detected vector detected in the preceding process from the vector memory 12, and sends the same as the initial vector to the motion vector calculating part 14. The motion vector calculating part 14 will not perform vector processing using the iterative gradient method of the detection block having been determined that processing is unnecessary by the vector evaluating part 15, only applying the iterative gradient method for the third or fourth time to other blocks, and sends the detected vectors to the vector evaluating part 15 and the vector memory 12. At this point of time, time corresponding to the processing of the detection block not subjected to calculation is spared, so the present loop is performed once again for the vector that has not yet reached the threshold value.

As described, by selecting vectors having low precision and repeatedly applying the iterative gradient method thereto, the overall precision of the detected vectors is enhanced, and the quality of the generated interpolated pictures is thereby improved.

The above description illustrates an example of a circuit according to the preferred embodiment of the present invention.

Subsequently, the video display apparatus according to the present invention performs interpolating vector evaluation, interpolated frame generation, time base conversion, and outputs picture signals in a similar manner as the prior art.

The invention claimed is:

1. A video image processing apparatus converting a frame rate using a frame rate conversion process that employs motion-compensated interpolation for at least some frames, comprising:
    a repeated-picture determining part determining when the frame rate conversion process generates consecutive identical pictures,
    a motion vector calculator calculating inter-frame motion vectors using an iterative process that recalculates the inter-frame motion vectors,
        responsive to the repeated-picture determining part determining that a current picture is identical to a previous picture, said motion vector calculator increasing a precision of the calculated inter-frame motion vector by increasing a number of iterations of the iterative process to recalculate the inter-frame motion vector, wherein the increased number of iterations is increased relative to a case in which the repeated picture determining part determines that the current picture is not identical to the previous picture,
    wherein the motion vector calculator utilizes a time interval during which consecutive identical pictures appear to increase the number of iterations of the iterative process to recalculate the inter-frame motion vectors.

2. The video image processing apparatus according to claim 1, wherein the iterative process used by the motion vector calculator is an iterative gradient method.

3. The video display apparatus according to claim 1, further comprising a circuit for determining a precision of the inter-frame motion vectors calculated via the motion vector calculator using a threshold value defined in advance.

4. The video display apparatus according to claim 3, wherein the inter-frame motion vectors determined as having a high precision in the determining circuit are not subjected to subsequent iterations of the recalculation process, and a spared calculation time thereof is applied to additional iterations of the iterative process to recalculate low precision vectors.

* * * * *